(12) United States Patent
Chaganti et al.

(10) Patent No.: US 11,656,879 B2
(45) Date of Patent: May 23, 2023

(54) AUTOMATED OS NETWORKING CONFIGURATION SYSTEM

(71) Applicant: Dell Products L.P., Round Rock, TX (US)

(72) Inventors: Ravikanth Chaganti, Bangalore (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 300 days.

(21) Appl. No.: 17/019,630

(22) Filed: Sep. 14, 2020

(65) Prior Publication Data

US 2022/0083349 A1 Mar. 17, 2022

(51) Int. Cl.
*G06F 9/445* (2018.01)
*H04L 41/00* (2022.01)

(52) U.S. Cl.
CPC .......... *G06F 9/44505* (2013.01); *H04L 41/20* (2013.01)

(58) Field of Classification Search
CPC . G06F 9/44505; G06F 9/45558; H04L 41/08; H04L 41/20; H04L 41/0803
See application file for complete search history.

(56) References Cited

U.S. PATENT DOCUMENTS

| | | | |
|---|---|---|---|
| 7,249,377 B1 | 7/2007 | Lita et al. | |
| 11,019,033 B1* | 5/2021 | Perlman | H04L 63/0218 |
| 11,455,277 B2* | 9/2022 | Singh | G06F 21/64 |
| 2015/0195129 A1* | 7/2015 | Nilakantan | H04L 41/0886 709/220 |
| 2017/0048223 A1* | 2/2017 | Anantha Padmanaban | H04L 63/0807 |
| 2018/0351881 A1* | 12/2018 | Hamdi | H04L 41/08 |
| 2018/0367528 A1* | 12/2018 | Schwarz | H04L 9/0894 |
| 2021/0064547 A1* | 3/2021 | Chhabra | G06F 11/1068 |
| 2021/0173945 A1* | 6/2021 | Karr | H04L 9/14 |
| 2022/0206832 A1* | 6/2022 | Berry | H04L 67/10 |

* cited by examiner

*Primary Examiner* — Blake J Rubin
(74) *Attorney, Agent, or Firm* — Joseph Mencher

(57) ABSTRACT

An automated operating system networking configuration system includes a server computing device with an operating system that is included in a trust domain, and a management controller device included in the trust domain and coupled to the server computing device via a management channel. The management controller device identifies an operating system networking configuration for the operating system and transmits an instruction via the management channel to the server computing device to perform operating system networking configuration operations using the operating system networking configuration. A management service in the operating system receives the instruction from the management controller device via the management channel and, in response to receiving the instruction while being in the trust domain with the management controller device, automatically retrieves the operating system networking configuration. The management service then automatically configures the operating system using the operating system networking configuration.

20 Claims, 11 Drawing Sheets

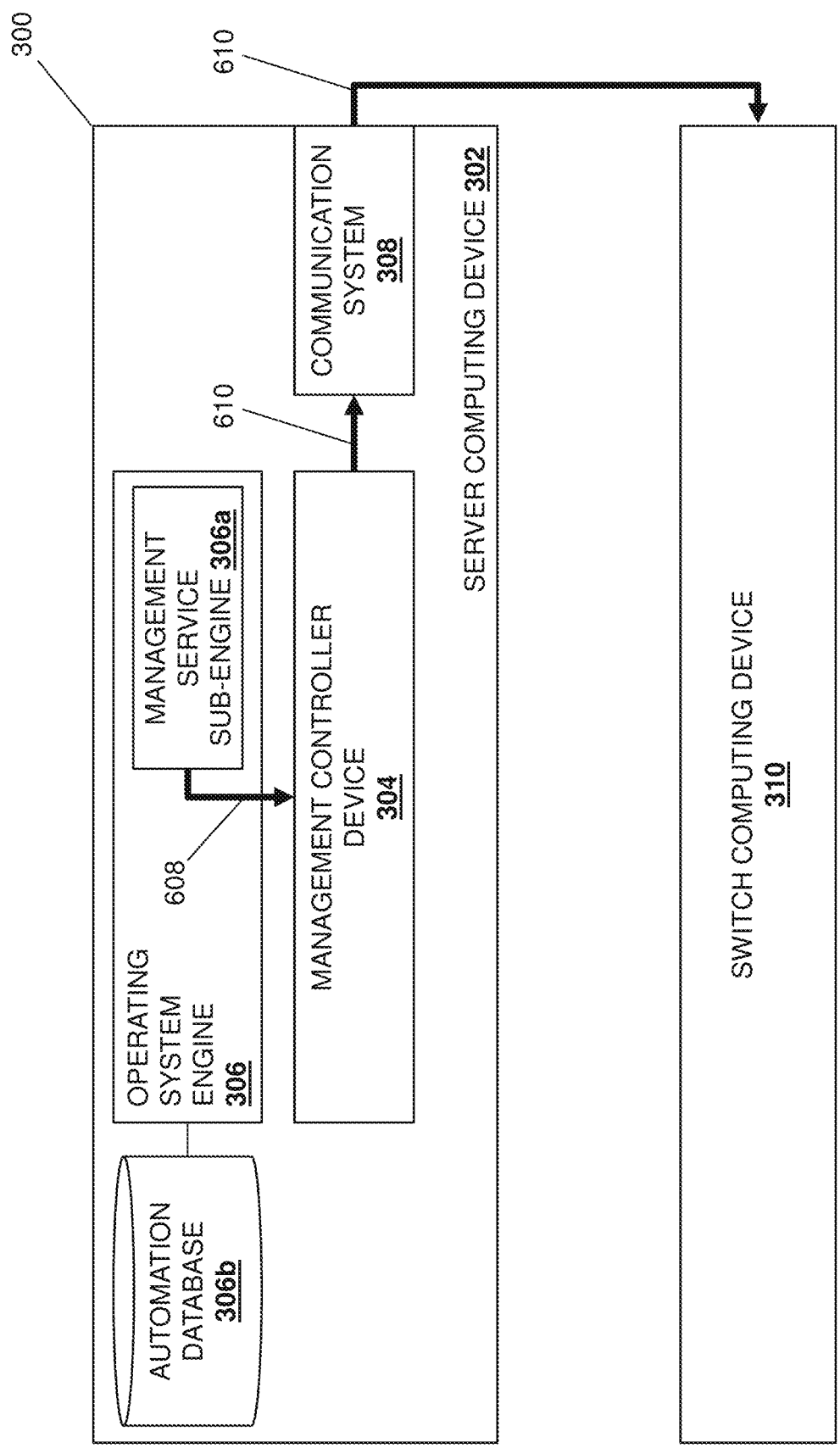

AUTOMATED OS NETWORKING CONFIGURATION SYSTEM

BACKGROUND

The present disclosure relates generally to information handling systems, and more particularly to automatically configuring networking in an operating system of an information handling system that is included in a hyper-converged infrastructure system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes utilized to provide hyper-converged infrastructure systems, which one of skill in the art in possession of the present disclosure will recognize is a software-defined Information Technology (IT) infrastructure that virtualizes the elements of conventional hardware-defined systems. For example, server computing device(s), switch computing device(s), and/or storage computing device(s) may be configured in a hyper-converged infrastructure system to provide virtualized computing functionality (e.g., via a hypervisor or other virtualized computing component), software-defined storage, and/or virtualized/software-defined networking. The conventional configuration of such hyper-converged infrastructure systems can raise some issues.

Hyper-converged infrastructure systems may be configured with different validated/supported networking topologies. For example, some AZURE STACK® hyper-converged infrastructures available from MICROSOFT® Corporation of Redmond, Wash., United States, support four different physical networking topologies for storage/management data traffic and virtual machine data traffic, and four variations of those physical networking topologies to support customer-specific datacenter integrations. When deploying such hyper-converged infrastructure systems, operating system networking is configured according to the physical networking topology, but there will often be multiple possible operating system networking configurations available for any particular physical networking topology.

The inventors of the present disclosure describe techniques for automatically determining an operating system networking configuration for an operating system in a server computing device in U.S. patent application Ser. No. 17/019,555, filed on Sep. 14, 2020, the disclosure of which is incorporated herein by reference in its entirety. That patent application discusses how the physical topology provided by the connection of the server computing device to switch computing devices, along with switch port configurations of switch ports on those switch computing devices connected to that server computing device, may be automatically identified and then utilized to determine an appropriate networking configuration for the operating system on the server computing device.

However, the provisioning of such an operating system networking configuration on an operating system utilized by a server computing device can raise some issues. In order to configure networking on an operating system in a server computing device, network access to that server computing device is required. However, in many situations (e.g., upon initialization of the server computing device), the server ports connected to the switch computing devices will have no network connectivity, thus preventing access to the server computing device (and its operating system) that is required to perform the operating system networking configuration. As such, conventional operating system networking configuration operations require manual configuration of the server ports in order to provide the network connectivity required for operating system networking configuration. Furthermore, even in cases where network connectivity is enabled on the server ports of the server computing device, configuration of the networking for the operating system networking requires authentication to the operating system on the server computing device, which is a manual process that further inhibits the automation of the configuration of networking on the operating system utilized by the server computing device.

Accordingly, it would be desirable to provide an automated operating system networking configuration system that addresses the issues discussed above.

SUMMARY

According to one embodiment, an Information Handling System (IHS) includes a management controller device that is included in a trust domain and that is configured to: identify an operating system networking configuration; and transmit, via a management channel, an instruction to perform operating system networking configuration operations using the operating system networking configuration; a processing system that is coupled to the manage controller device; and a memory system that is coupled to the processing system and that includes instructions that, when executed by the processing system, cause the processing system to provide an operating system engine that is included in the trust domain and that is configured to: receive, from the management controller device via the management channel, the instruction to perform operating system networking configuration operations using the operating system networking configuration; automatically retrieve, in response to receiving the instruction from the management controller device while being in the trust domain with the management controller device, the operating system networking configuration; and automatically configure, in response to retrieving the operating system networking configuration, an operating system provided by the operating system engine using the operating system networking configuration.

BRIEF DESCRIPTION OF THE DRAWINGS

FIG. 6E is a schematic view illustrating an embodiment of devices in the computing device configuration of FIG. 3 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
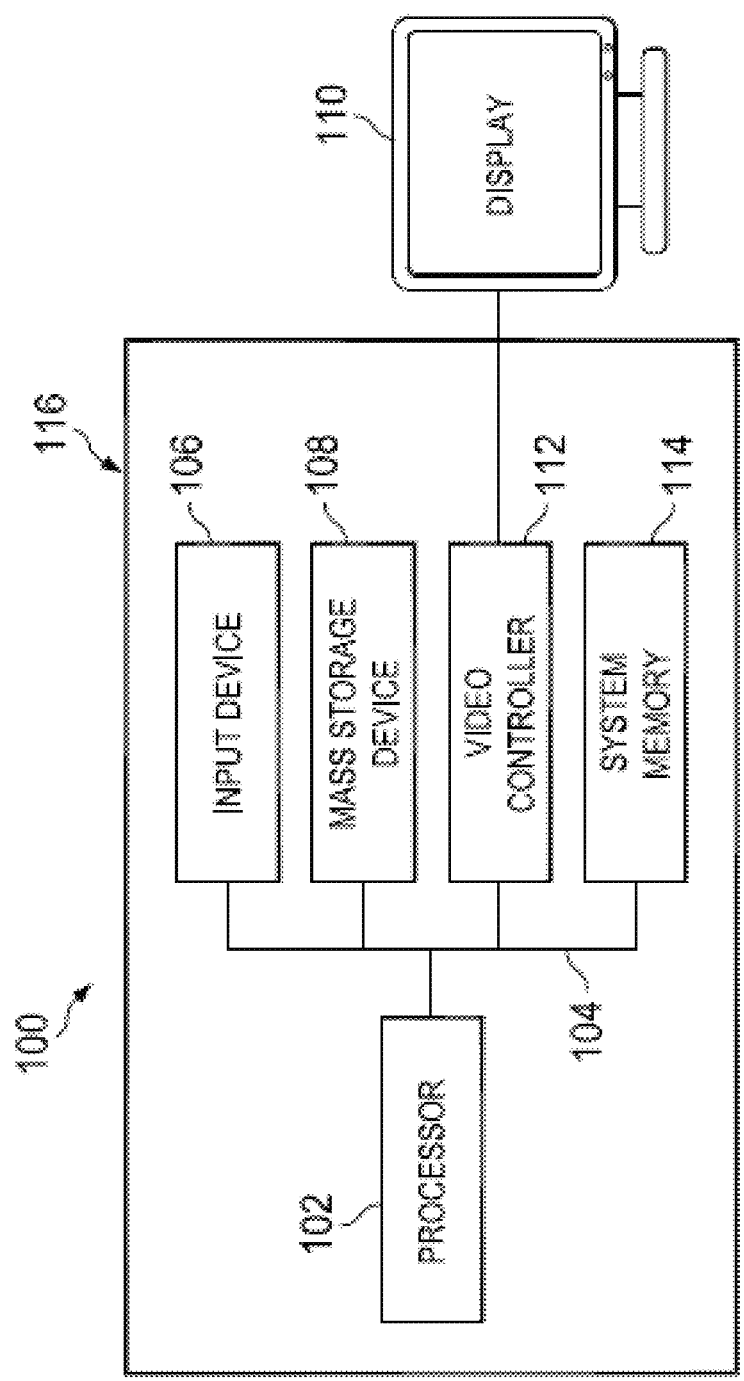
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
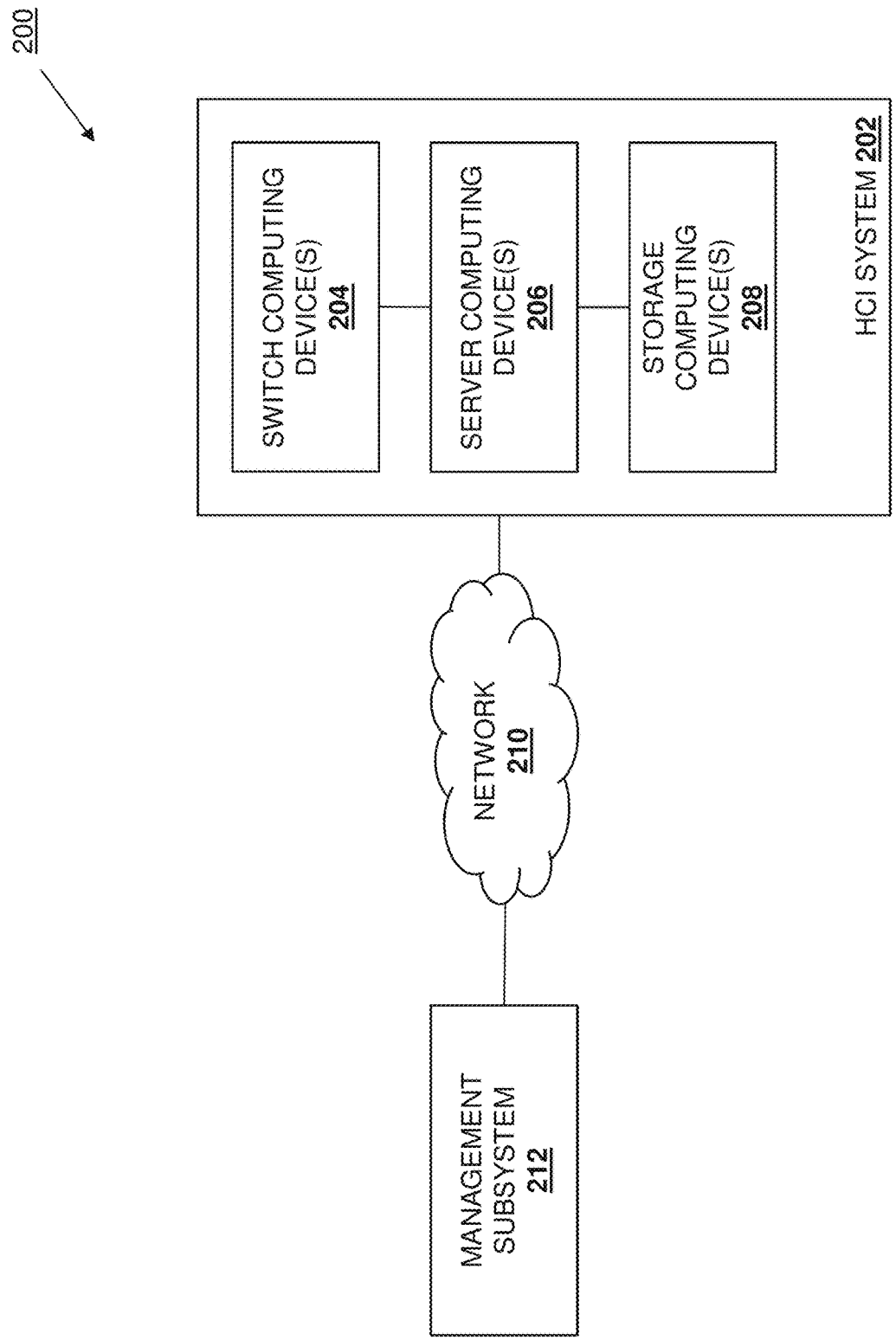
FIG. 2 is a schematic view illustrating an embodiment of an automated operating system networking configuration system.

Referring now to FIG. 2, an embodiment of an automated operating system networking configuration system 200 is illustrated. In the illustrated embodiment, the automated operating system networking configuration system 200 includes a hyper-converged infrastructure system 202 that includes one or more switch computing devices 204, one or more server computing devices 206, and one or more storage computing devices 208, each of which are coupled together and configured to operate to provide hyper-converged infrastructure functionality that virtualizes the elements of conventional hardware-defined systems via the provisioning of virtualized computing functionality (e.g., via a hypervisor or other virtualized computing component), software-defined storage, and/or virtualized/software-defined networking. In an embodiment, any or all of the switch computing devices 204, server computing devices 206, and/or storage computing devices 208 may be provided by the IHS 100 discussed above with reference to FIG. 1, and/or may include some or all of the components of the IHS 100.

In the examples below, one of the server computing devices 206 includes an operating system that has its networking configuration determined using techniques described by the inventors of the present disclosure in U.S. patent application Ser. No. 17/019,555, filed on Sep. 14, 2020, the disclosure of which is incorporated herein by reference in its entirety, and the networking for the operating system in that server computing device may then be configured according to the teachings of the present disclosure discussed below, but one of skill in the art in possession of the present disclosure will recognize that any of the switch computing devices 204, server computing devices 206, and/or storage computing devices 208 may include an operating system that may have its networking configuration applied using the teachings herein while remaining within the scope of the present disclosure as well.

In a specific example, the switch computing device(s) 204 may be provided by Top Of Rack (TOR) switch device(s) in a rack, with the server computing device(s) 206 and the storage computing device(s) 208 provided by server device(s) and storage device(s) that are included in that rack and coupled to the TOR switch device(s). However, while illustrated and discussed as being provided by TOR switch device(s), server device(s), and storage device(s), one of skill in the art in possession of the present disclosure will recognize that computing devices provided in the automated operating system networking configuration system 200 may include any devices that may be configured to operate similarly as the computing devices discussed below. As such, in some embodiments, any of the switch computing device(s) 204, server computing device(s) 206, and/or storage computing device(s) 208 may be omitted from the HCI system 202 while remaining within the scope of the present disclosure as well.

In the illustrated embodiment, the HCI system 202 is coupled to a network 210 that may be provided by a Local Area Network (LAN), the Internet, combinations thereof, and/or any other network that would be apparent to one of skill in the art in possession of the present disclosure. Furthermore, the illustrated embodiment includes a management subsystem 212 that is also coupled to the network 210. In an embodiment, the management subsystem 212 may be provided by the IHS 100 discussed above with reference to FIG. 1, and/or may include some or all of the components of the IHS 100, and in the specific examples discussed below may be provided by one or more server devices that are configured to perform the management subsystem functionality described below. However, while illustrated and discussed as being provided by server device(s) connected to the HCI system 202 via a network 210, one of skill in the art in possession of the present disclosure will recognize that management subsystem provided in the automated operating system networking configuration system 200 may include any devices that may be configured to operate similarly as the management subsystem 212 discussed below.

For example, in some embodiments, the management subsystem functionality described below may be performed by management controller device(s) in the switch computing device(s) 204, server computing device(s) 206, and/or storage computing device(s) 208 (e.g., an integrated DELL® Remote Access Controller (iDRAC) device available in server devices provided by DELL® Inc. of Round Rock, Tex., United States, a Baseboard Management Controller (BMC) device, and/or other management controller devices known in the art) while remaining within the scope of the present disclosure as well. Thus, while a specific automated operating system networking configuration system 200 has been illustrated and described, one of skill in the art in possession of the present disclosure will recognize that the automated operating system networking configuration system of the present disclosure may include a variety of components and component configurations while remaining within the scope of the present disclosure as well.

Figure 3:
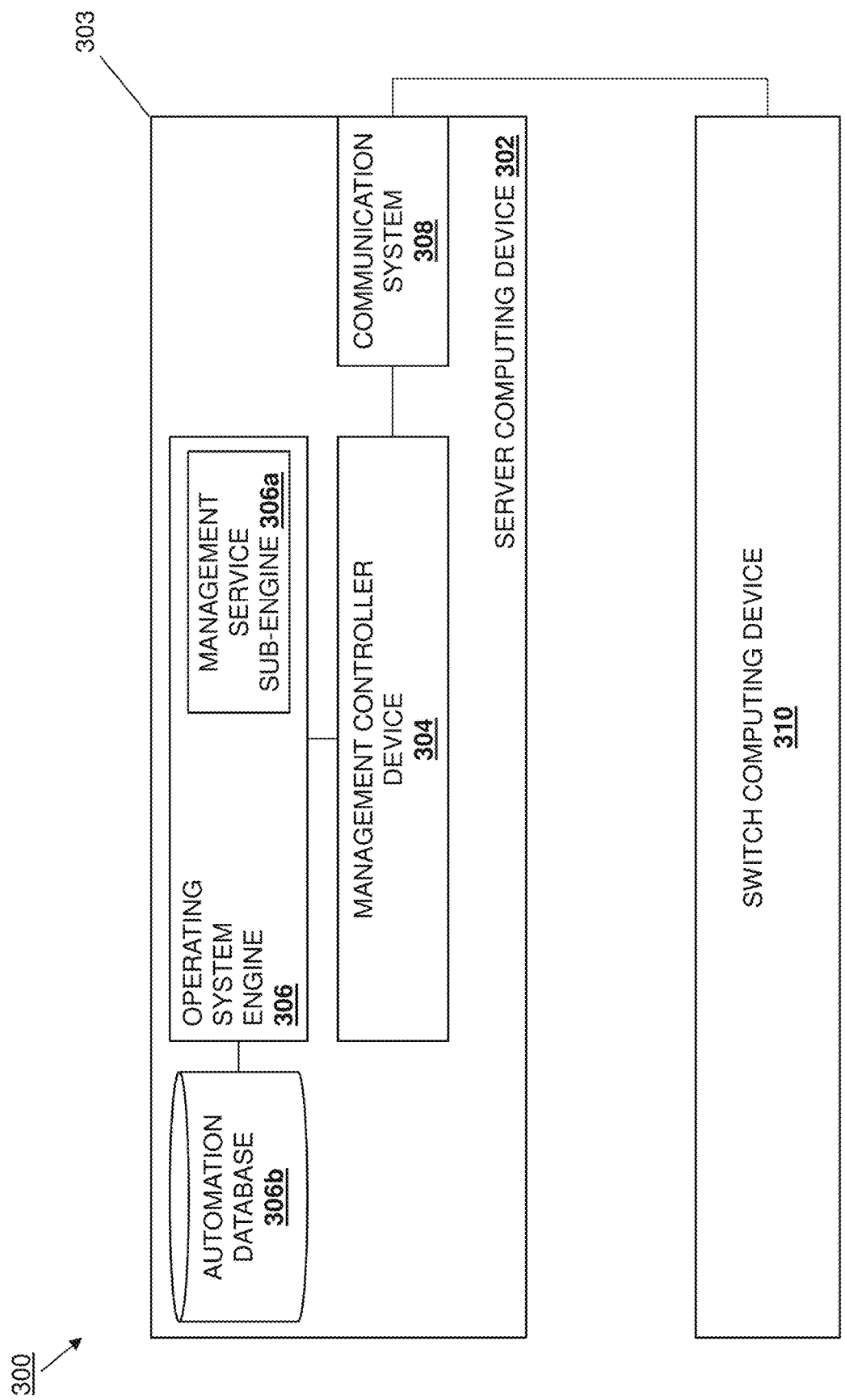
FIG. 3 is a schematic view illustrating an embodiment of a computing device configuration that may be provided in the automated operating system networking configuration system of FIG. 2.

Referring now to FIG. 3, an embodiment of a computing device configuration 300 is illustrated that includes a server computing device 302 that may be provided by one of the server computing devices 206 discussed above with reference to FIG. 2. As such, the server computing device 302 may be provided by the IHS 100 discussed above with reference to FIG. 1 and/or may include some or all of the components of the IHS 100. However, while illustrated and discussed as being provided by a server device in many of the examples below, one of skill in the art in possession of the present disclosure will recognize that the functionality of the server device 302 discussed below may be provided by other devices (e.g., the switch computing device(s) 204, the storage computing device(s) 208, etc.) that are configured to operate similarly as the server computing device 302 discussed below. In the illustrated embodiment, the server computing device 302 includes a chassis 303 that houses the components of the server computing device 302, only some of which are illustrated in FIG. 3.

For example, the chassis 303 may house a management controller device 304 that may be provided by the iDRAC® discussed above, a BMC, and/or any other management controller device that would be apparent to one of skill in the art in possession of the present disclosure. As will be appreciated by one of skill in the art in possession of the present disclosure, the management controller device 304 may provide an out-of-band management platform for the server computing device 302 that utilizes resources (e.g., a dedicated processing system, memory system, network connection, access to the system bus, etc.) that are mostly separate from the server computing device 302 and provides a browser-based or command-line interface for managing and/or monitoring the server computing device 302.

As illustrated, the chassis 303 may also house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an operating system engine 306 that is coupled to the management controller device 304 (e.g., via a coupling of the processing system and the management controller device 304) and that is configured to perform the functionality of the operating system engines and/or server computing devices discussed below. Furthermore, as illustrated and discussed below, the operating system engine 306 may include a management service sub-engine 306a (e.g., provided via instructions on the memory system that, when executed by the processing system, cause the processing system to provide the management service sub-engine 306a) that may be provided by an integrated Service Module (iSM) included in the iDRAC® discussed above, and/or other management services that would be apparent to one of skill in the art in possession of the present disclosure. As will be appreciated by one of skill in the art in possession of the present disclosure, the management controller device 304 may be coupled to the operating system engine 306 via a management channel that may be available to the management controller device 304 even when other communication channels coupled to the operating system engine 306 are unavailable.

The chassis 303 may also house a storage system (not illustrated, but which may include the storage 108 discussed above with reference to FIG. 1) that is coupled to the operating system engine 306 (e.g., via a coupling between the storage system and the processing system) and that includes an automation database 306b that is configured to store any of the information utilized by the operating system 306 discussed below. For example, as discussed in further detail below, the automation database 306b may be provided during automated operating system networking configuration operations via the provisioning of a virtual storage device (e.g., a virtual Universal Serial Bus (USB) device) that includes operating system networking configuration automation information in the automation database 306b, although other storage devices/automation databases are envisioned as falling within the scope of the present disclosure as well.

The chassis 303 may also house a communication system 308 that is coupled to the management controller device 304 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In an embodiment, the management controller device 304 may be coupled to the communication system 308 via a management channel that is available to the management controller device 304 even when other communication channels in the server computing device 302 are unavailable (e.g., when the server computing device 302 is powered down). As illustrated, the computing device configuration 300 also includes a switch computing device 310 that may be provided by one of the switch computing devices 204 discussed above with reference to FIG. 2, and that is coupled to the server computing device 302 via the communication system 308. As discussed below, the connection between the server computing device 302 and the switch computing device 310 may include a management channel to the management controller device 304, which one of skill in the art in possession of the present disclosure will recognize may be part of a management network that allows access to the management controller device 304 in order to perform management operations on the server computing device 302. However, while particular a computing device configuration 300 is illustrated and described that includes a switch computing device and a server computing device, one of skill in the art in possession of the present disclosure will appreciate that other computing device configurations (e.g., other types of computing devices) will fall within the scope of the present disclosure as well.

Figure 4:
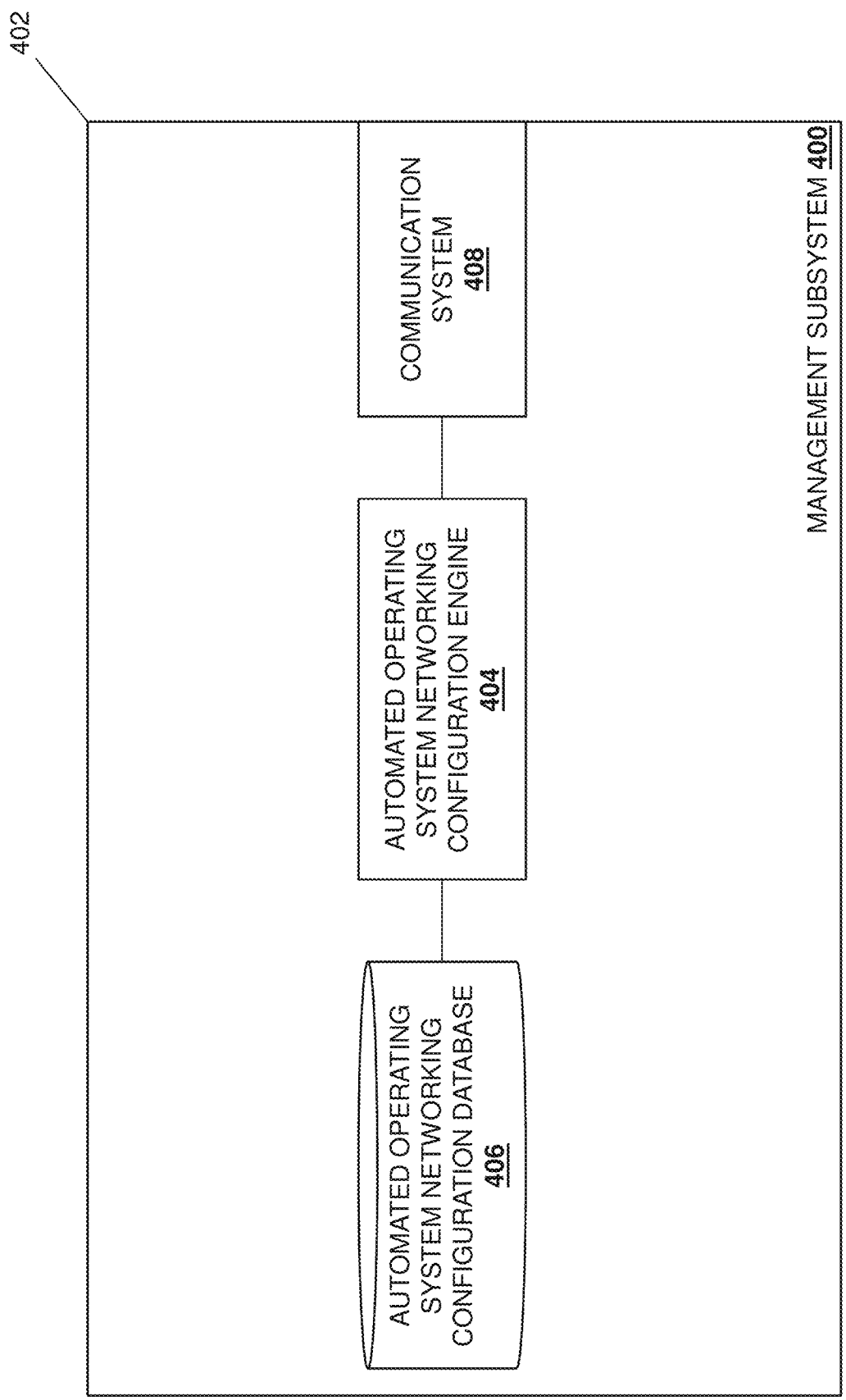
FIG. 4 is a schematic view illustrating an embodiment of a management subsystem that may be provided in the automated operating system networking configuration system of FIG. 2.

Referring now to FIG. 4, an embodiment of a management subsystem 400 is illustrated that may provide the management subsystem 212 discussed above with reference to FIG. 2, or in any of the any of the switch computing device(s) 204, server computing device(s) 206, and/or storage computing device(s) 208 discussed above with reference to FIG. 2. As such, the management subsystem 400 may be provided by the IHS 100 discussed above with reference to FIG. 1 and/or may include some or all of the components of the IHS 100, and in specific examples may be provided by one or more server devices connected to the network 210, or may be provided by a management controller device (e.g., the iDRAC® or BMC discussed above) in one of the server computing devices 206 or switch computing devices 204 as discussed below. However, while illustrated and discussed as being provided by specific devices in many of the examples below, one of skill in the art in possession of the present disclosure will recognize that the functionality of the management subsystem 400 discussed below may be provided by other devices that are configured to operate similarly as the management subsystem 400 discussed below.

In the illustrated embodiment, the management subsystem 400 includes a chassis 402 that houses the components of the management subsystem 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an automated operating system networking configuration engine 404 that is configured to perform the functionality of the automated operating system networking configuration engines and/or management subsystems discussed below.

The chassis 402 may also house a storage system (not illustrated, but which may include the storage 108 discussed above with reference to FIG. 1) that is coupled to the automated operating system networking configuration engine 404 (e.g., via a coupling between the storage system and the processing system) and that includes an automated operating system networking configuration database 406 that is configured to store any of the information utilized by the automated operating system networking configuration engine 404 discussed below. The chassis 402 may also house a communication system 408 that is coupled to the automated operating system networking configuration engine 404 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific management subsystem 400 has been illustrated, one of skill in the art in possession of the present disclosure will recognize that management subsystems (or other devices operating according to the teachings of the present disclosure in a manner similar to that described below for the management subsystem 400) may include a variety of components and/or component configurations for providing conventional management subsystem functionality, as well as the functionality discussed below, while remaining within the scope of the present disclosure as well.

Figure 5:
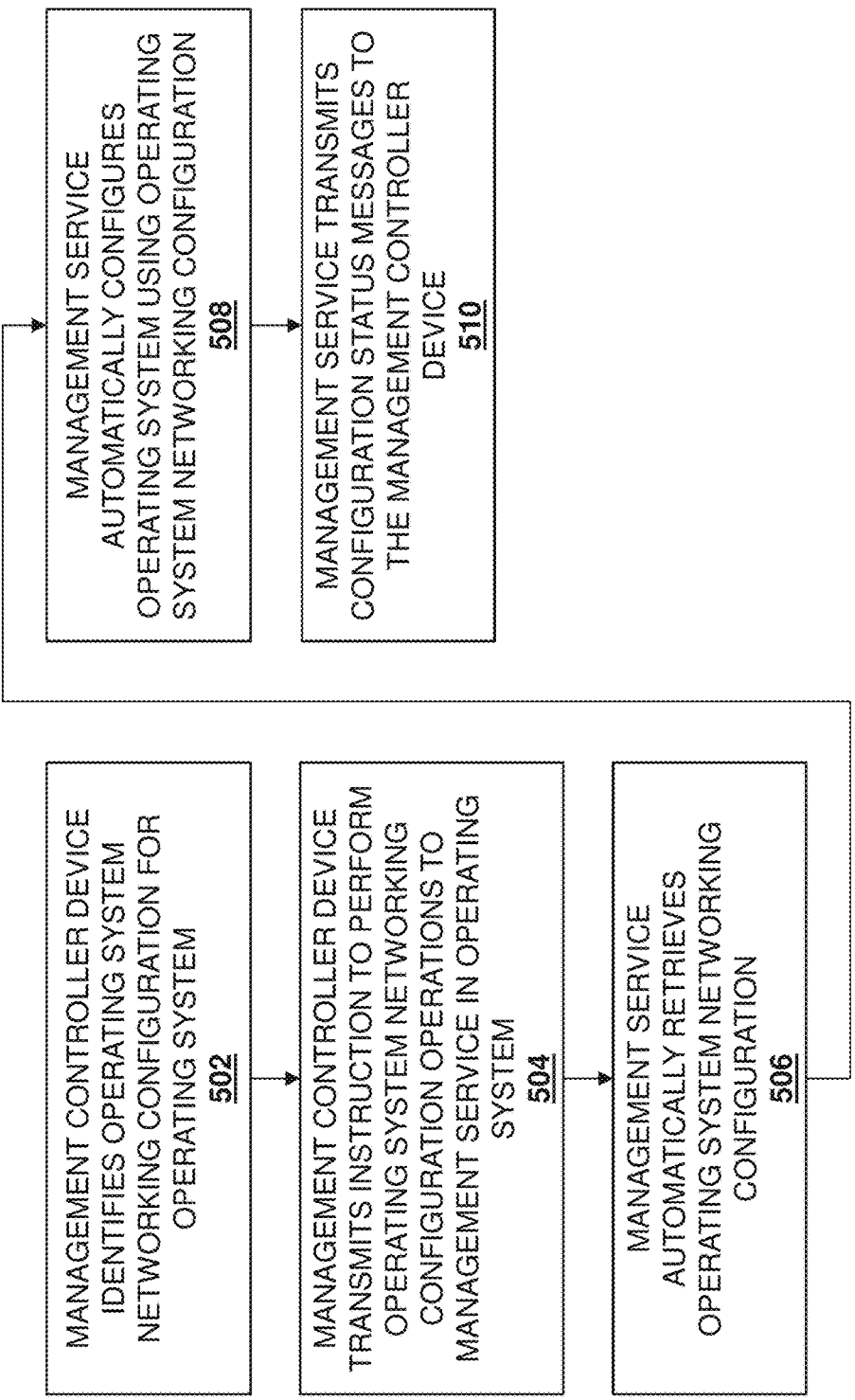
FIG. 5 is a flow chart illustrating an embodiment of a method for automatically configuring networking in an operating system.

Referring now to FIG. 5, an embodiment of a method 500 for automatically configuring networking in an operating system is illustrated. As discussed below, the systems and methods of the present disclosure provide for the automated configuration of networking for an operating system without the need for conventional manual operations via the use of a trust domain in order to provide a proxy to reach the operating system and perform networking configuration operations (e.g., command inquiry and execution tasks) in a secure manner. As such, a management service provided in the operating system of a server computing device that is part of a trust domain may act as a proxy between the operating system and a management controller device in the server computing device that also belongs to that trust domain, which allows the management controller device to authorize operating system networking configurations of an operating system at a "bare-metal" level in the server computing device in a fully automated manner.

For example, the automated operating system networking configuration system of the present disclosure may include a server computing device with an operating system that is included in a trust domain, and a management controller device included in the trust domain and coupled to the server computing device via a management channel. The management controller device identifies an operating system networking configuration for the operating system and transmits an instruction via the management channel to the server computing device to perform operating system networking configuration operations using the operating system networking configuration. A management service in the operating system receives the instruction from the management controller device via the management channel and, in response to receiving the instruction while being in the trust domain with the management controller device, automatically retrieves the operating system networking configuration. The management service then automatically configures the operating system using the operating system networking configuration. As such, a customer may simply connect a server computing device to TOR switch device(s), and have an automatically-determined operating system networking configuration automatically provided on the operating system of that server computing device without any manual operations required by the customer.

In some embodiments, prior to or during the method 500, a "trust domain" may be built for the hyper-converged infrastructure system 202 as described by the inventors of the present disclosure in U.S. patent application Ser. No. 17/019,523, filed on Sep. 14, 2020, the disclosure of which is incorporated herein by reference. As such, as described in that patent application, the computing devices in the HCI system 202 may be configured to utilize authentication information and a computing device component hash value to have their communications validated by each other without the need for credentials or certificates that are required to secure communications in conventional hyper-converged infrastructure systems. Furthermore, in embodiments in which the management subsystem 212 is utilized in the method 500, the management subsystem 212 may join the trust domain for the HCI system 202 as well, which as discussed in some of the examples below allows the computing devices in the hyper-converged infrastructure 202 to confirm that the management subsystem 212 is part of the trust domain for the hyper-converged infrastructure system 202, and exchange information with the management subsystem 212 in a secure manner and without the need for credentials or certificates that are required to secure communications in conventional hyper-converged infrastructure systems. Thus, the communications exchanged between the computing devices in the HCI system 202 as discussed below, as well as by the management subsystem 212 with the computing devices discussed in some embodiments below, may be performed as part of a trust domain.

In some embodiments, server computing devices 206 in the hyper-converged infrastructure system 202 may be discovered by the management subsystem 212 (or other device providing the management subsystem functionality discussed below) using techniques described by the inventors of the present disclosure in U.S. patent application Ser. No. 17/019,714, filed on Sep. 14, 2020, the disclosure of which is incorporated herein in its entirety. As such, as described in that patent application, the management subsystem 212 may broadcast a discovery request that is configured to cause only the server computing devices 206 in the hyper-converged infrastructure system 202 to respond with identity information for those server computing devices 206, which allows the management subsystem 212 to discovery those server computing devices 206.

Further still, prior to or during the method 500, an operating system networking configuration may be determined for the operating system in the server computing device 206/302 discussed below using techniques described by the inventors of the present disclosure in U.S. patent application Ser. No. 17/019,555, filed on Sep. 14, 2020, the disclosure of which is incorporated herein by reference. As described in that patent application, an automated operating system networking configuration may be determined for an operating system in a server computing device based on a physical networking topology of the server computing device and its connected switch computing devices, along with port configuration information retrieved from those switch computing devices. For example, a management subsystem (coupled to a plurality of switch computing devices and a server computing device via a network, or provided in the server computing device) may determine that the server computing device is connected to a plurality of switch ports, identify that the plurality of switch computing devices include the plurality of switch ports and, in response, retrieve switch port configuration information for the plurality of switch ports from the plurality of switch devices. Based on a physical topology provided by the plurality of switch computing devices connected to the server computing device via the plurality of switch ports and the switch port configuration information for the plurality of switch ports, the management subsystem may then determine an operating system networking configuration, and transmit the operating system networking configuration to the server computing device.

Figure 6A:
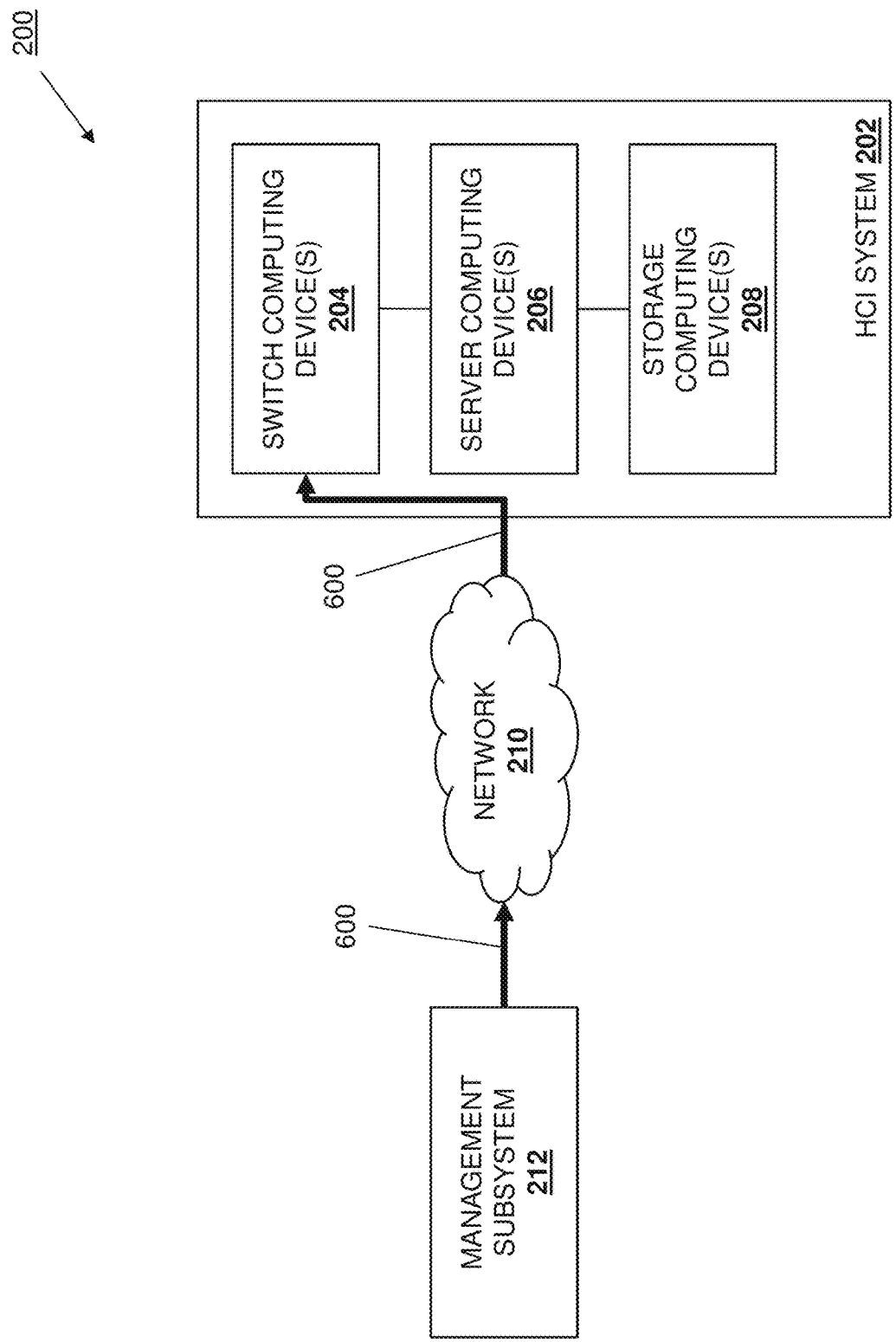
FIG. 6A is a schematic view illustrating an embodiment of the automated operating system networking configuration system of FIG. 2 operating during the method of FIG. 5.
Figure 6B:
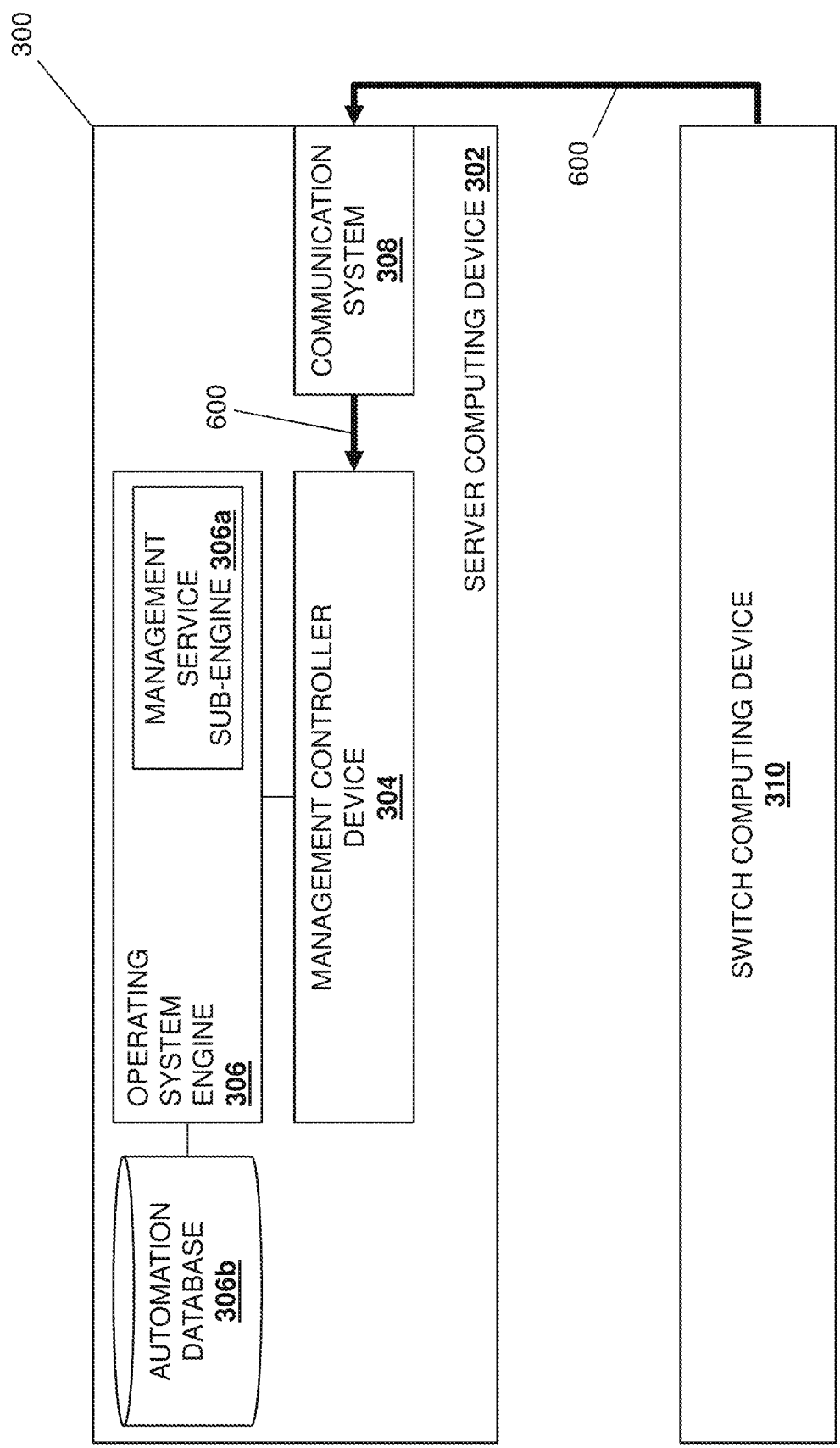
FIG. 6B is a schematic view illustrating an embodiment of devices in the computing device configuration of FIG. 3 operating during the method of FIG. 5.

Thus, the method 500 may begin at block 502 where a management controller device identifies an operating system networking configuration for an operating system. As discussed above, in some embodiments of block 502, the automated operating system networking configuration engine 404 in the management subsystem 212/400 may determine the operating system networking configuration for the operating system provided by the operating system engine 306 in the server computing device 206/302 and, as illustrated in FIGS. 6A and 6B, may perform operating system networking configuration transmission operations 600 to transmit the operating system networking configuration via the network 210 and to the switch computing device 204/310. Furthermore, as part of the operating system networking configuration transmission operations 600, the switch computing device 310 may forward the operating system networking configuration received via the network 210 from the management subsystem 212 to the server computing device 206/304 such that the management controller device 304 receives (and identifies) the operating system networking configuration via the communication system 308 at block 502. As will be appreciated by one of skill in the art in possession of the present disclosure, the management controller device 304 may have access to the operating system provided by the operating system engine 306 even when other server ports (e.g., non-management server ports) on the communication system 308 are not configured to connect to the network 210, and thus the transmission of the operating system networking configuration to the management controller device 304 may allow that operating system networking configuration to be applied by the management controller device 304 to the operating system as discussed below.

In some embodiments, and as described by the inventors of the present disclosure in U.S. patent application Ser. No. 17/019,523, filed on Sep. 14, 2020, the disclosure of which is incorporated herein by reference, the management subsystem 202 and switch computing device 204/310 may perform the trust domain operations described in that patent application in order for the switch computing device 204/310 to validate the operating system networking configuration received from the management subsystem 212 (e.g., by verifying that the management subsystem 212 is part of (and/or should remain in) the trust domain for the hyper-converged infrastructure system 202). Similarly, in some embodiments the switch computing device 204/310 and the management controller device 304 may perform the trust domain operations described in that patent application in order for the management controller device 304 to validate the operating system networking configuration received from the switch computing device 204/310 (e.g., by verifying that the switch computing device 204/310 is part of (and/or should remain in) the trust domain for the hyper-converged infrastructure system 202). As such, the operating system networking configuration received (and identified) by the management controller device 304 may be validated without the use of credentials or certificates that are required in conventions hyper-converged infrastructure systems.

However, as also discussed above, in some embodiments the management controller device 304 in the server computing device 206/302 may operate to determine the operating system networking configuration for the operating system provided by the operating system engine 306 in the server computing device 206/302, and thus the determination of the operating system networking configuration by the management controller device 304 in the server computing device 206/302 may result in the management controller device 304 identifying the operating system networking configuration for the operating system provided by the operating system engine 306 in the server computing device 206/302 at block 502. Furthermore, in some embodiments, the switch computing device 204/310 (e.g., an automation service running in the switch computing device 204/310) may operate to determine the operating system networking configuration for the operating system provided by the operating system engine 306 in the server computing device 206/302 and transmit that operating system networking configuration to the server computing device 206/302, and thus the receiving of the operating system networking configuration by the management controller device 304 from the switch computing device 204/310 may result in the management controller device 304 identifying the operating system networking configuration for the operating system provided by the operating system engine 306 in the server computing device 206/302 at block 502. However, while a few specific examples are provided, one of skill in the art in possession of the present disclosure will appreciate that the identification of the operating system networking configuration by the management controller device 304 in the server computing device 206/302 may performed in a variety of manners that will fall within the scope of the present disclosure as well.

Figure 6C:
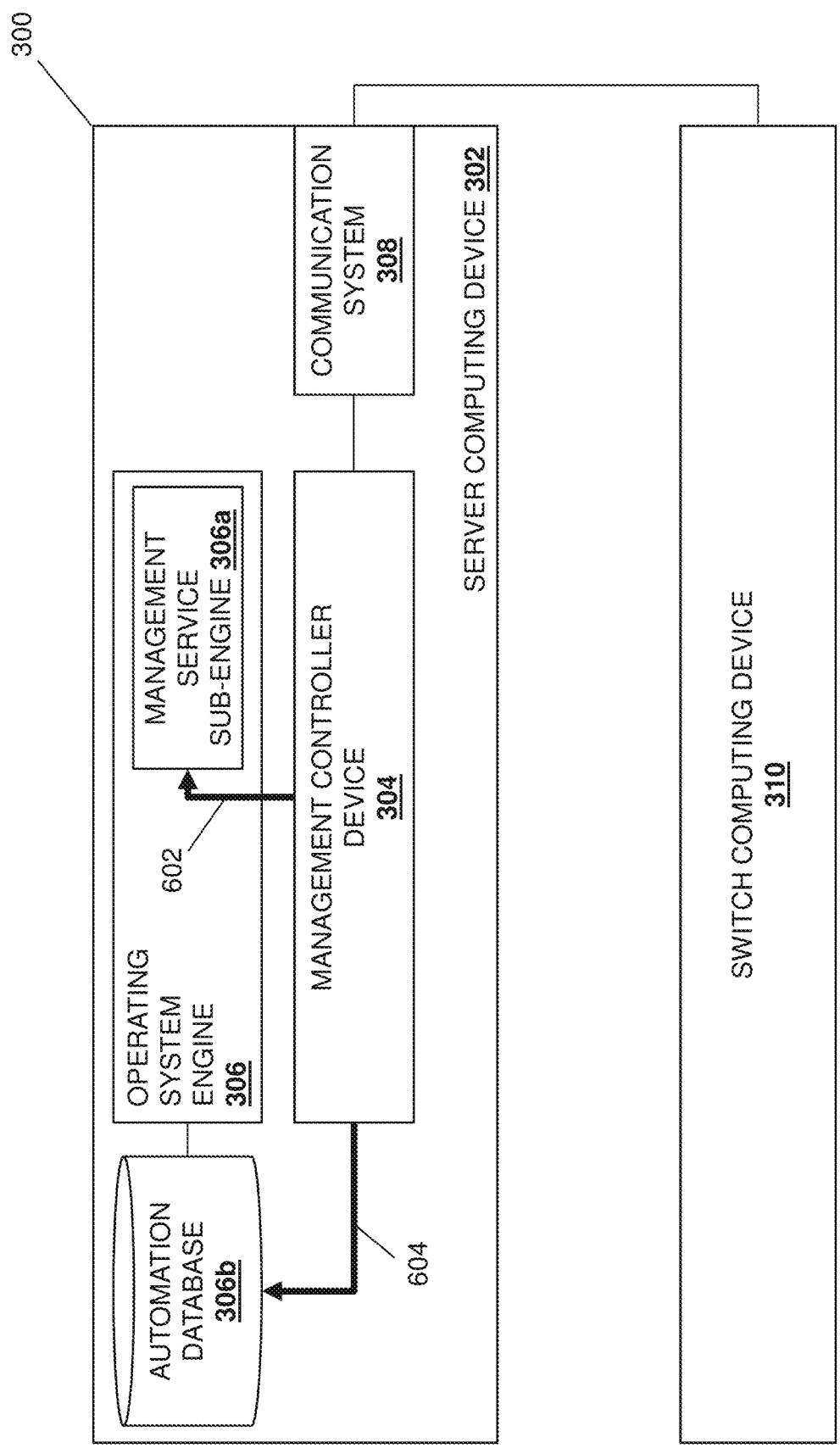
FIG. 6C is a schematic view illustrating an embodiment of devices in the computing device configuration of FIG. 3 operating during the method of FIG. 5.

The method 500 then proceeds to block 504 where the management controller device transmits an instruction to perform operating system networking configuration operations to a management service in the operating system. As illustrated in FIG. 6C, in an embodiment of block 504, the management controller device 304 in the server device 206/302 may perform operating system networking configuration instruction transmission operations 602 in order to transmit an instruction to perform operating system networking configuration operations to the management service sub-engine 306a (e.g., via the management channel discussed above). For example, in some embodiments, subsequent to verifying that the operating system networking configuration was received from a device/system included in the trust domain for the hyper-converged infrastructure system 202 (e.g., the management system 212 and/or the switch computing device 204/310) the management controller device 304 in the server device 206/302 may identify metadata included with the operating system networking configuration as defining an operating system networking configuration task and, in response, forward an operating system networking configuration task request (i.e., the instruction to perform operating system networking configuration operations) to the management service sub-engine 306a.

However, as also discussed above, in some embodiments the management controller device 304 in the server computing device 206/302 may operate to determine the operating system networking configuration for the operating system provided by the operating system engine 306 in the server computing device 206/302, which may be followed by the operating system networking configuration instruction transmission operations 602 that transmit the instruction to perform operating system networking configuration operations to the management service sub-engine 306a (e.g., via the management channel discussed above). Similarly as discussed above, at block 504 the management controller device 304 in the server device 206/302 may transmit an operating system networking configuration task request (i.e., the instruction to perform operating system networking configuration operations) to the management service sub-engine 306a. However, while a few specific examples are provided, one of skill in the art in possession of the present disclosure will appreciate that the instruction to perform the operating system networking configuration may be transmitted by the management controller device 304 in the server computing device 206/302 in a variety of manners that will fall within the scope of the present disclosure as well.

In some embodiments, and as described by the inventors of the present disclosure in U.S. patent application Ser. No. 17/019,523, filed on Sep. 14, 2020, the disclosure of which is incorporated herein by reference, the management service sub-engine 306a in the operating system engine 306 may perform the trust domain operations described in that patent application in order for the management service sub-engine 306a to validate the instruction to perform the operating system networking configuration operations received from the management controller device 304 (e.g., by verifying that the management controller device 304 is part of (and/or should remain in) the trust domain for the hyper-converged infrastructure system 202). As such, the instruction to perform the operating system networking configuration operations received by the management service sub-engine 306a may be validated without the use of credentials or certificates that are required in conventions hyper-converged infrastructure systems.

In some embodiments, at block 504, the operating system networking configuration may be bundled or otherwise provided as part of an automation package (e.g., an operating system automation pack including by a bundle of operating system networking configuration scripts) in the automation database 308b. For example, with reference to FIG. 6C, the management controller device 304 may perform operating system networking configuration provisioning operations 604 in order to store the automation package in a virtual storage device (e.g., a virtual USB device or other media device) that is provided on a storage system that is accessible to the management service sub-engine 306a and that may be included in the management controller device 304, included in the server computing device 302, connected through the communication system 308 via the network 210, and/or at other storage locations that would be apparent to one of skill in the art in possession of the present disclosure.

Figure 6D:
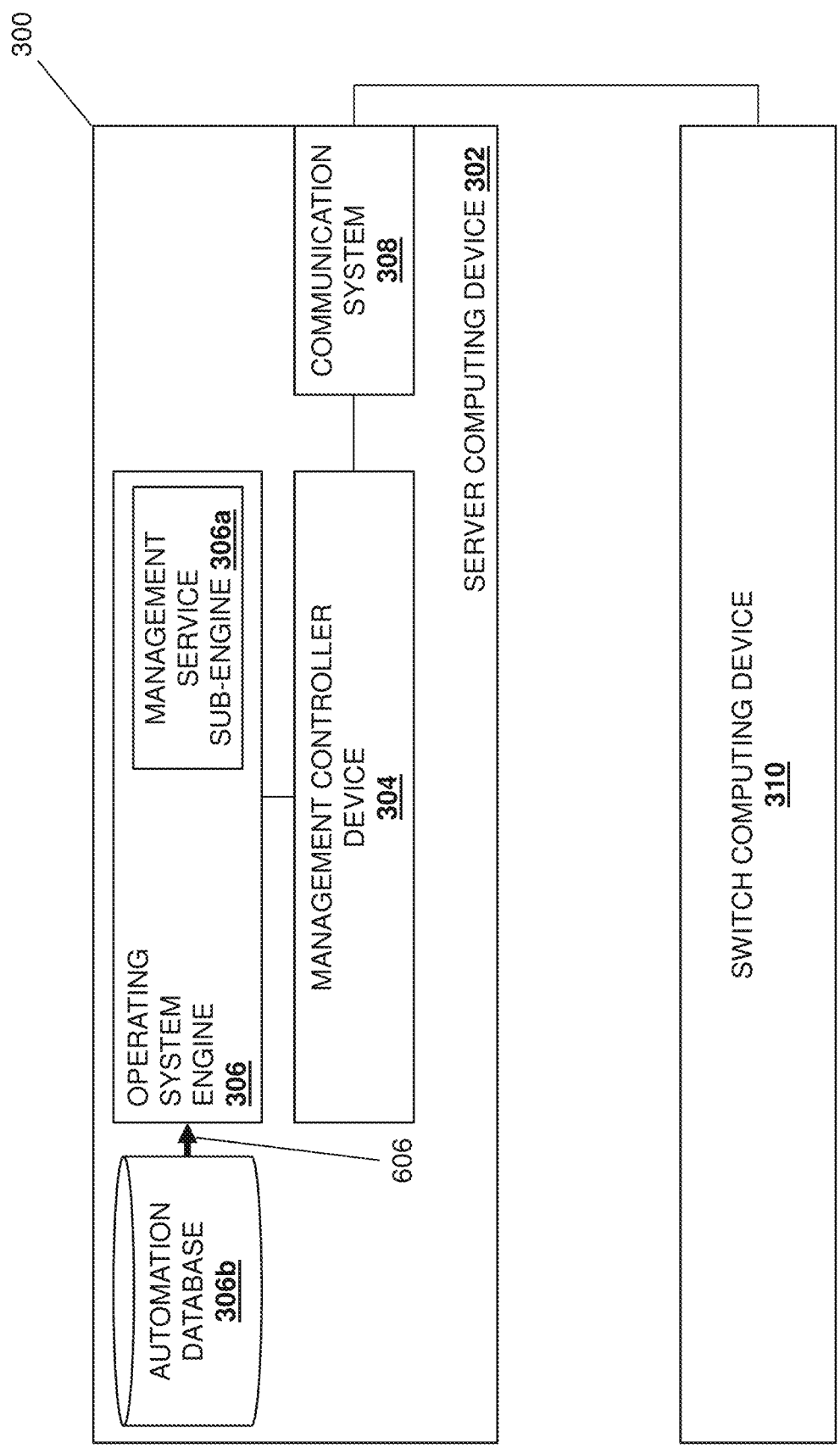
FIG. 6D is a schematic view illustrating an embodiment of devices in the computing device configuration of FIG. 3 operating during the method of FIG. 5.

The method 500 then proceeds to block 506 where the management service automatically retrieves the operating system networking configuration. With reference to FIG. 6D, in an embodiment of block 506 and in response to receiving the instruction to perform the operating system networking configuration operations and validating that instruction as having been received from the management controller device 304 in its trust domain (i.e., the trust domain for the hyper-converged infrastructure system 202), the management service sub-engine 306a included in the operating system engine 306 may perform operating system networking configuration retrieval operations 606 that include "mounting" or otherwise retrieving the automation package from the automation database 306b included in the virtual storage device discussed above. However, while specific operations for retrieving the operating system networking configuration have been described, one of skill in the art in possession of the present disclosure will appreciate that the operating system engine 306 may retrieve the operating system networking configuration in a variety of manners that will fall within the scope of the present disclosure as well.

The method 500 then proceeds to block 508 where the management service automatically configures the operating system using the operating system networking configuration. In an embodiment, at block 508, the management service sub-engine 306a included in the operating system engine 306 executes the "mounted" or otherwise retrieved operating system networking configuration in order to configure the networking in the operating system provided by the operating system engine 306. One of skill in the art in possession of the present disclosure will recognize that a variety of networking configuration operations that may be performed by the management service sub-engine 306a at block 508 using the operating system networking configuration while remaining within the scope of the present disclosure.

Figure 6F:
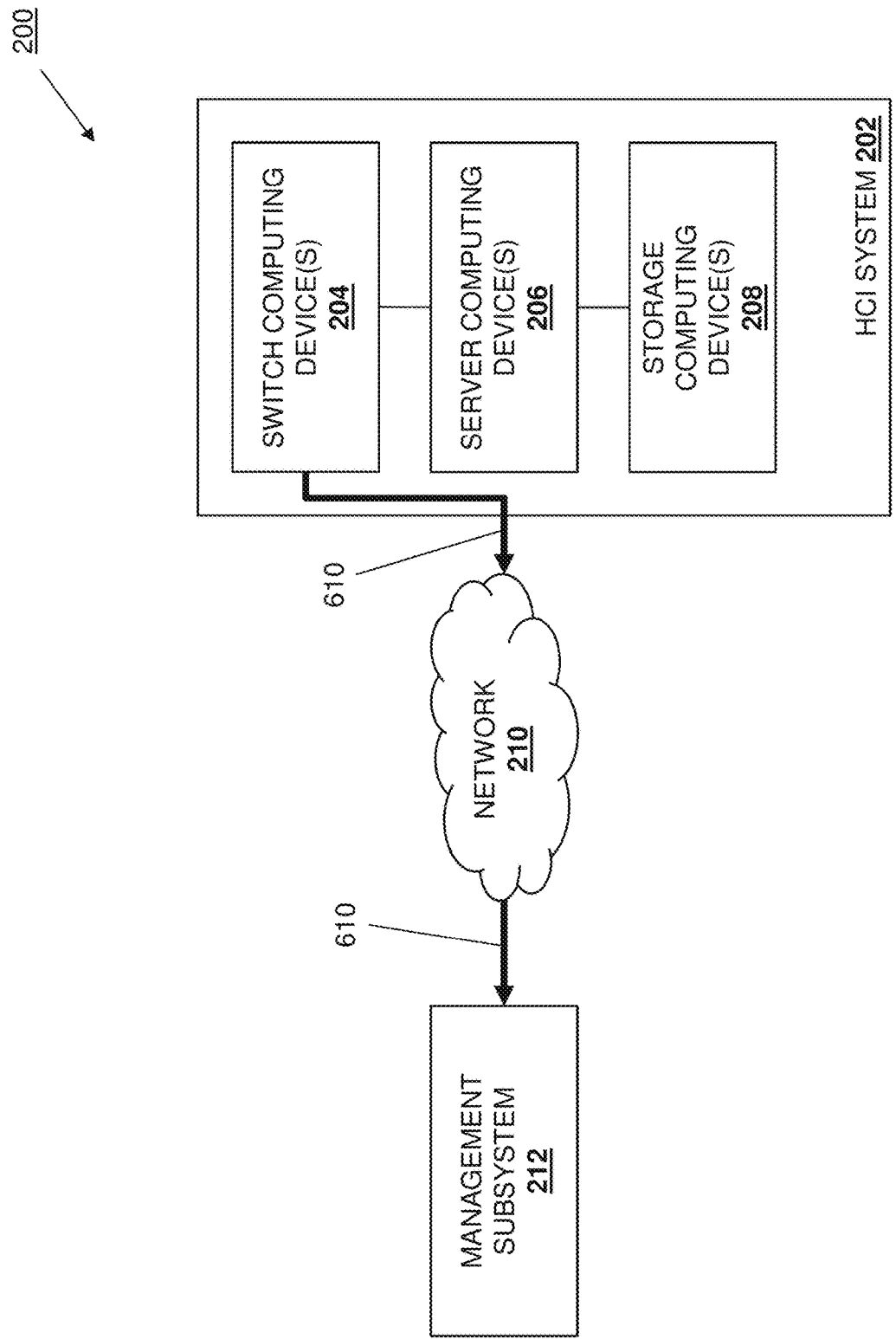
FIG. 6F is a schematic view illustrating an embodiment of the automated operating system networking configuration system of FIG. 2 operating during the method of FIG. 5

The method 500 then proceeds to block 510 where the management service transmits configuration status messages to the management controller device. With reference to FIGS. 6E and 6F, in an embodiment of block 510 and as part of the configuration of the operating system networking configuration at block 508, the management service sub-engine 306a may perform configuration status message transmission operations 608 in order to transmit configuration status messages corresponding to the status of the configuration of the networking for the operating system provided by the operating system engine 306 (e.g., a configuration initiation message, a variety of intermediate configuration status messages, and a configuration completion message) to the management controller device 304 (e.g., via the management channel discussed above). As will be appreciated by one of skill in the art in possession of the present disclosure, in embodiments in which the management controller device 304 determined the operating system networking configuration as discussed above, the configuration status messages may be received by the management controller device 304 and used by the management controller device 304 to monitor the configuration of the networking in the operating system provided by the operating system engine 306.

However, in embodiments in which the switch computing device 204/310 or the management subsystem 212 determined the operating system networking configuration as discussed above, the configuration status messages may be received by the management controller device 304, and the management controller device 304 may perform configuration status update operations 610 to transmit configuration status updates that are based on the configuration status messages through the communication system 308 and to the switch computing device 310, and in some embodiments via the network 210 to the management subsystem 212. As will be appreciated by one of skill in the art in possession of the present disclosure, the switch computing device 204/310 or the management subsystem 212 may use the configuration status updates to monitor the configuration of the networking in the operating system provided by the operating system engine 306.

Thus, systems and methods have been described that provide for the automated configuration of networking for a server device operating system without the need for conventional manual operations via the use of a trust domain in order to provide a proxy to reach the server device operating system and perform networking configuration operations (e.g., command inquiry and execution tasks) in a secure manner. A management service provided in the server device operating system of a server computing device that is part of a trust domain may act as a proxy between the server device operating system and a management controller device in the server computing device that also belongs to the trust domain, which allows the management controller device to authorize operating system networking configurations of the server device operating system at a "bare-metal" level in the server computing device and in a fully automated manner. As such, a server computing device may simply be connected to TOR switch device(s) and have an automatically-determined operating system networking configuration automatically provided on the server device operating system of that server computing device without any manual operations required by the customer.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automated operating system networking configuration system, comprising:
    a server computing device that is configured to provide an operating system that is included in an infrastructure system associated with infrastructure-specific information that was used to generate predefined authentication information that provides a trust domain; and
    a management controller device that is included in the infrastructure system and that is coupled to the server computing device via a management channel, wherein the management controller device is configured to:
        identify an operating system networking configuration for the operating system provided by the server computing device; and
        transmit, via the management channel to the operating system provided by the server computing device, an instruction to perform operating system networking configuration operations using the operating system networking configuration, the predefined authentication information, and a management controller device component hash value; and
    a management service that is included in the operating system provided by the server computing device, wherein the management service is configured to:
        receive, from the management controller device via the management channel, the instruction to perform operating system networking configuration operations using the operating system networking configuration;
        automatically determine, based on the predefined authentication information and the management controller device component hash value and without performing credential/certificate-based authentication, that the management service is in the trust domain with the management controller device;
        automatically retrieve, in response to receiving the instruction from the management controller device and determining the management service is in the trust domain with the management controller device, the operating system networking configuration; and
        automatically configure, in response to retrieving the operating system networking configuration, the operating system provided by the server device using the operating system networking configuration.

2. The system of claim 1, wherein the management controller device is configured to identify the operating system networking configuration by receiving the operating system networking configuration via a network from a management console, and wherein the management controller device is configured to:
determine that the management console is included in the trust domain with the management controller device and, in response, transmit the instruction via the management channel to the operating system.

3. The system of claim 1, wherein the management controller device is configured to:
provide a virtual storage device that is accessible to the management service and that includes the operating system networking configuration, wherein the management service is configured to automatically retrieve the operating system networking configuration from the virtual storage device.

4. The system of claim 1, wherein the management service is configured to:
transmit operating system networking configuration status messages to the management controller device.

5. The system of claim 4, wherein the management controller device is configured to:
provide operating system networking configuration status updates that are based on the operating system networking configuration status messages via a network to a management console.

6. The system of claim 1, wherein the automatically determining that the management service is in the trust domain with the management controller device includes:
determining that the predefined authentication information received with the instruction to perform operating system networking configuration operations using the operating system networking configuration matches the predefined authentication information generated using the infrastructure-specific information associated with the infrastructure system; and
determining that the management controller device component hash value has not changed relative to a previous management controller device component hash value received from the management controller device.

7. The system of claim 1, further comprising:
a switch computing device that is coupled to the server computing device, wherein the management controller device is configured to identify the operating system networking configuration by receiving the operating system networking configuration via the switch device.

8. An Information Handling System (IHS), comprising:
a management controller device that is included in an infrastructure system associated with infrastructure-specific information that was used to generate predefined authentication information that provides a trust domain and that is configured to:
identify an operating system networking configuration; and
transmit, via a management channel, an instruction to perform operating system networking configuration operations using the operating system networking configuration, the predefined authentication information, and a management controller device component hash value;
a processing system that is coupled to the manage controller device; and
a memory system that is coupled to the processing system and that includes instructions that, when executed by the processing system, cause the processing system to provide an operating system engine that is included in the trust domain and that is configured to:
receive, from the management controller device via the management channel, the instruction to perform operating system networking configuration operations using the operating system networking configuration;
automatically determine, based on the predefined authentication information and the management controller device component hash value and without performing credential/certificate-based authentication, that the management service is in the trust domain with the management controller device;
automatically retrieve, in response to receiving the instruction from the management controller device and determining the management service is in the trust domain with the management controller device, the operating system networking configuration; and
automatically configure, in response to retrieving the operating system networking configuration, an operating system provided by the operating system engine using the operating system networking configuration.

9. The IHS of claim 8, wherein the management controller device is configured to identify the operating system networking configuration by receiving the operating system networking configuration via a network from a management console, and wherein the management controller device is configured to:
determine that the management console is included in the trust domain with the management controller device and, in response, transmit the instruction via the management channel.

10. The IHS of claim 8, wherein the management controller device is configured to:
provide a virtual storage device that is accessible to the operating system engine and that includes the operating system networking configuration, wherein the operating system engine is configured to automatically retrieve the operating system networking configuration from the virtual storage device.

11. The IHS of claim 8, wherein the operating system engine is configured to:
transmit operating system networking configuration status messages to the management controller device.

12. The IHS of claim 11, wherein the management controller device is configured to:
provide operating system networking configuration status updates that are based on the operating system networking configuration status messages via a network to a management console.

13. The IHS of claim 8, wherein the automatically determining that the management service is in the trust domain with the management controller device includes:
determining that the predefined authentication information received with the instruction to perform operating system networking configuration operations using the operating system networking configuration matches the predefined authentication information generated using the infrastructure-specific information associated with the infrastructure system; and
determining that the management controller device component hash value has not changed relative to a previous management controller device component hash value received from the management controller device.

14. A method for automatically configuring networking in an operating system, comprising:

identifying, by a management controller device that is included in an infrastructure system associated with infrastructure-specific information that was used to generate predefined authentication information that provides a trust domain, an operating system networking configuration for an operating system provided by a server computing device;

transmitting, by the management controller device via a management channel to the operating system, an instruction to perform operating system networking configuration operations using the operating system networking configuration, the predefined authentication information, and a management controller device component hash value;

receiving, by a management service in the operating system from the management controller device via the management channel, the instruction to perform operating system networking configuration operations using the operating system networking configuration;

automatically determining, by the management service based on the predefined authentication information and the management controller device component hash value and without performing credential/certificate-based authentication, that the management service is in the trust domain with the management controller device;

automatically retrieving, by the management service in response to receiving the instruction from the management controller device and determining the management service is in the trust domain with the management controller device, the operating system networking configuration; and automatically configuring, by the management service in response to retrieving the operating system networking configuration, the operating system provided by the server device using the operating system networking configuration.

15. The method of claim 14, wherein the management controller device identifies the operating system networking configuration by receiving the operating system networking configuration via a network from a management console, and wherein the method further comprises:

determining, by the management service, that the management console is included in the trust domain with the management controller device and, in response, transmitting the instruction via the management channel to the operating system.

16. The method of claim 14, further comprising:

providing, by the management controller device, a virtual storage device that is accessible to the management service and that includes the operating system networking configuration, wherein the management service automatically retrieves the operating system networking configuration from the virtual storage device.

17. The method of claim 14, further comprising:

transmitting, by the management service, operating system networking configuration status messages to the management controller device.

18. The method of claim 17, further comprising:

providing, by the management controller device, operating system networking configuration status updates that are based on the operating system networking configuration status messages via a network to a management console.

19. The method of claim 14, wherein the automatically determining that the management service is in the trust domain with the management controller device includes:

determining that the predefined authentication information received with the instruction to perform operating system networking configuration operations using the operating system networking configuration matches the predefined authentication information generated using the infrastructure-specific information associated with the infrastructure system; and determining that the management controller device component hash value has not changed relative to a previous management controller device component hash value received from the management controller device.

20. The method of claim 14, wherein the management controller device identifies the operating system networking configuration by receiving the operating system networking configuration via a switch device.

* * * * *